United States Patent [19]
Bergkessel

[11] Patent Number: 6,102,440
[45] Date of Patent: Aug. 15, 2000

[54] SEAT BELT WITH COMPLIANCE LIGHT AND LOCK

[76] Inventor: Robert Bergkessel, 275 Sterling Ave., Apt. B304, Sharon, Pa. 16146

[21] Appl. No.: 09/126,731

[22] Filed: Jul. 31, 1998

[51] Int. Cl.[7] .................................................. B80R 22/00
[52] U.S. Cl. .......................... 280/808; 280/801.1; 70/18; 297/217.6; 297/468; 297/483
[58] Field of Search .................................. 280/801.1, 808; 70/18; 297/217.6, 482, 468, 483

[56] References Cited

U.S. PATENT DOCUMENTS

| D. 359,709 | 6/1995 | Miller . | |
|---|---|---|---|
| 3,440,602 | 4/1969 | Frig . | |
| 3,592,028 | 7/1971 | Monica | 70/57 |
| 3,633,697 | 1/1972 | Silver | 180/270 |
| 3,875,556 | 4/1975 | Beaird . | |
| 4,245,376 | 1/1981 | Lassche | 24/639 |
| 4,365,285 | 12/1982 | Brundidge | 362/32 |
| 4,523,258 | 6/1985 | Morse et al. . | |
| 4,791,711 | 12/1988 | Adams . | |
| 4,795,190 | 1/1989 | Weightman et al. . | |
| 4,849,733 | 7/1989 | Conigliaro . | |
| 4,933,818 | 6/1990 | Eckmann | 362/61 |
| 5,149,189 | 9/1992 | Kawamura | 362/108 |
| 5,181,773 | 1/1993 | Colvin | 362/75 |
| 5,220,713 | 6/1993 | Lane, Jr. . | |
| 5,380,067 | 1/1995 | Turvill et al. . | |
| 5,579,561 | 12/1996 | Smith et al. . | |
| 5,590,904 | 1/1997 | Ellis et al. . | |
| 5,627,512 | 5/1997 | Bogar et al. . | |
| 5,630,382 | 5/1997 | Barbera et al. . | |
| 5,656,994 | 8/1997 | Heninger . | |
| 5,660,460 | 8/1997 | McLeod, Jr. | 362/103 |
| 5,690,413 | 11/1997 | Coughlin . | |
| 5,732,975 | 3/1998 | Gallegos | 280/808 |
| 5,892,436 | 4/1999 | Blackburn et al. | 340/457.1 |

FOREIGN PATENT DOCUMENTS

WO 93/20728   10/1993   WIPO .

*Primary Examiner*—Brian L. Johnson
*Assistant Examiner*—Deanna Draper
*Attorney, Agent, or Firm*—Richard C. Litman

[57] ABSTRACT

A seat belt with light and lock. A manually operated light attached to the seat belt provides a visual indication of seat belt use. A key-operated lock on the buckle prevents a child from unfastening the buckle while the vehicle is moving.

6 Claims, 3 Drawing Sheets

SEAT BELT WITH COMPLIANCE LIGHT AND LOCK

BACKGROUND OF THE INVENTION

1. Field of the Invention

The present invention relates to safety belts for motor vehicles. Specifically, the invention is a manually operated light attached to the seat belt to provide a visual indicator of seat belt use, and a key operated buckle to prevent a child from removing the seat belt while the vehicle is moving.

2. Description of the Related Art

Several other inventors have attempted to devise a satisfactory solution to the problem of verifying compliance with seat belt laws. Most of these inventions provide some sort of visual indicia, visible from either inside or outside the car, that all seat belts are being worn. For example, U.S. Pat. No. 3,440,602, issued to Gerald E. Frig, describes a seat belt tension indicator which lights a lamp when a seat belt is not being worn. Secondly, U.S. Pat. No. 3,875,556, issued to Jesse B. Beaird, describes a seat belt light indicator requiring the driver to operate switches corresponding to the seat position of the occupants, so that failure of the occupants to put on their seat belts causes a light to remain lit, both on the console and outside the vehicle. Thirdly, U.S. Pat. No. 4,849,733, issued to Thomas S. Conigliaro et al., describes a seat belt indicator system wherein the system is activated by the weight of the driver on the driver's seat, and fastening a seatbelt illuminates lights on the dashboard and on the rear of the vehicle exterior. A fourth example is U.S. Pat. No. 5,627,512, issued to Marcia M. Bogar, describes an alarm attaching to a seat belt, which sounds when the seat belt is unbuckled.

Other inventors have used seat belt indicators working in conjunction with additional safety features. For example, U.S. Pat. No. 5,590,904, issued to Robert P. Ellis et al., describes a system for providing an electrical signal indicative of whether a seat belt is fastened. The signal can then be used to vary the activation of an airbag.

Some inventors have tried to provide unique incentives to induce children to wear their seat belts. For example, U.S. Pat. No. 5,656,994, issued to Brent D. Heninger, describes a clip mounted to a seat belt having a pressure switch. Activation of the pressure switch, indicating that the seat belt is being worn, enables a video game or other incentive device to be used by the child.

At least two inventors devised various visual indicia that a seat belt is properly fastened. U.S. Pat. No. 5,220,713, issued to Wendell C. Lane Jr. et al., describes a seat belt indicator having red and green lights, with the red light lit if a buckle is not completely fastened, and a green light is lit if it is completely fastened, to ensure that a person buckling a child into a seat does not leave the buckle only partially fastened. U.S. Pat. No. 5,380,067, issued to William W. Turvill et al., describes a child seat belt buckle having a male member with two different colors, and a female member with a hole for viewing the colors. As the buckle is fastened, the first color becomes visible through the opening. The second color then becomes visible, confirming that the buckle is properly buckled.

At least three inventors have attempted to ensure that seat belts are properly worn by developing tamper-resistant buckles.

For example, U.S. Pat. No. Des. 359,709, issued to Thomas B. Miller, shows a childproof seat belt lock. U.S. Pat. No. 4,791,711, issued to Wilbur R. Adams, describes a seat belt buckle having a three part button, all three parts of which must be operated simultaneously to release the buckle, making the buckle difficult for a child to operate. Lastly, International application WO 93/20728 describes a childproof seat belt locking device having a housing fitting over the buckle, with a pressure release button over the seat belt's release button. The button requires too much pressure for a small child to press it.

Another invention intended to improve the safety provided by seat belts includes U.S. Pat. No. 5,579,561, issued to Keith T. Smith et al., describing a child-resistant clamp for securing the lap and shoulder belts together. The invention prevents a child seat from being thrown forward due to slack in the shoulder Other related inventions include U.S. Pat. No. 4,523,258, issued to John H. Morse et al., describing a belt with a plurality of light emitting diodes around its length, and a manually activated alarm, for use by joggers and others who work around traffic at night; U.S. Pat. No. 4,795,190, issued to Judy M. Weightman et al., describing a decorative padded seat belt cover; U.S. Pat. No. 5,630,382, issued to Annette M. Barbera, describing an illuminated pet harness having a fiber optic core, illuminated by a bulb at one end of the fiber optic wire; and U.S. Pat. No. 5,690,413, issued to James Coughlin, describing a light for a marine vest.

None of the above inventions describes the combination of a manually operated light attached to a seat belt and a key-operated seat belt buckle.

None of the above inventions and patents, taken either singularly or in combination, is seen to describe the instant invention as claimed. Thus a seat belt with light and lock solving the aforementioned problems is desired.

SUMMARY OF THE INVENTION

The invention is a manually operated light attached to a seat belt, and a key operated seat belt buckle.

The light is preferably mounted to the shoulder portion of the belt, but could be mounted to the lap portion. It is battery-operated, with a standard light bulb. The color is preferably blue, but other colors could obviously be used.

When the user fastens his seat belt, he switches the light on.

If the car is stopped by a police officer, the officer can glance into the car and see the light, thereby verifying seat belt use.

The key-operated buckle prevents a child from releasing the seat belt while the car is in motion. The parent places the child in the seat, buckles the seat belt, and turns the key to lock the buckle. The child then has no way of unbuckling the belt while the car is in motion. The parent will preferably also activate the seat belt light to provide a visual indication of seat belt use.

Accordingly, it is a principal object of the invention to provide a visual indication of seat belt use to any police officer who stops a vehicle having the invention.

It is another object of the invention to ensure that a child does not unfasten the seat belt while the vehicle is moving.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a seat belt light providing a visual indication of seat belt use, and a locking belt buckle to prevent a child from removing the seat belt.

Figure 1:
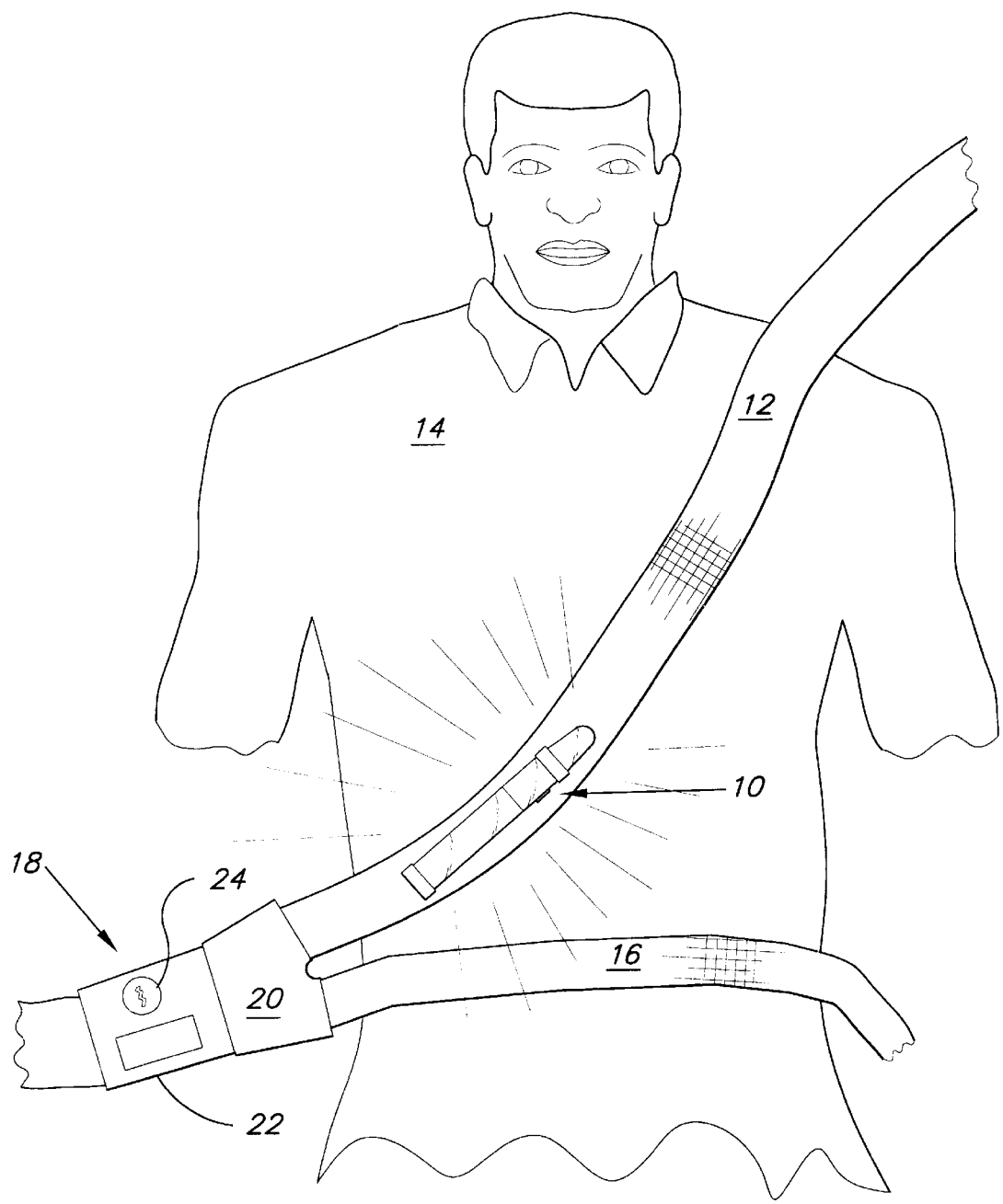
FIG. 1 is an environmental, perspective view of a seat belt with light and lock according to the present invention.

Referring to FIG. 1, the seat belt light 10 is attached to shoulder belt 12. The seat belt light 10 is battery-operated, with a standard light bulb. The seat belt light 10, although preferably mounted to the shoulder portion of the belt 12, could be mounted to the lap portion. However, when attached to the shoulder portion, light 10 can be easily manually operated and provides a clear visual indicator to the exterior that occupant 14 is wearing shoulder belt 12 and lap belt 16.

When the user fastens his seat belt, he switches the seat belt light 10 on. The color of the light emitted from the seat belt light 10 is preferably blue, but other colors could obviously be used. Therefore, if the car is stopped by a police officer, the officer can glance into the car and see the colored light from a distance, thereby verifying seat belt use. A sudden change in the presence of the blue light may also indicate that the occupant was not properly buckled in, and therefore not in compliance with safety laws.

Figure 2:
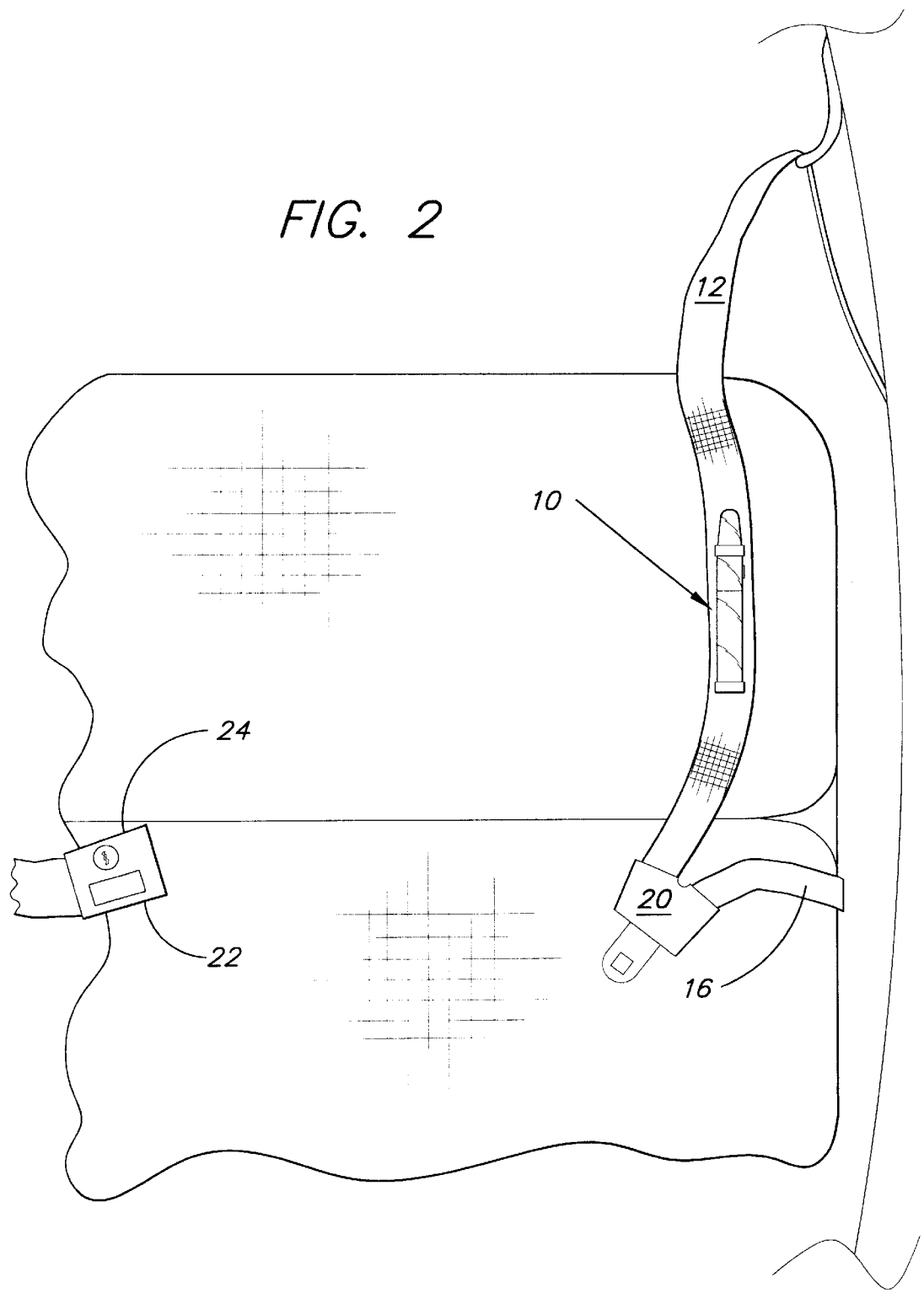
FIG. 2 is an environmental view of the seat belt with light and lock when the seat belt is retracted.

Referring to FIG. 2, buckle 18 is unfastened. Seat belt light 10 is shown "off", and clearly affixed to the seat belt, remaining attached to shoulder belt 12 regardless of use of the belt, so that the light will be ready for immediate use when an occupant enters the vehicle. The exact position of light 10 may be determined relative to the resting position of the shoulder portion, such that the light does not impinge upon the ordinary function of the seat belt, yet is positioned adequately high on the shoulder portion to be seen through an auto window.

Figure 3:
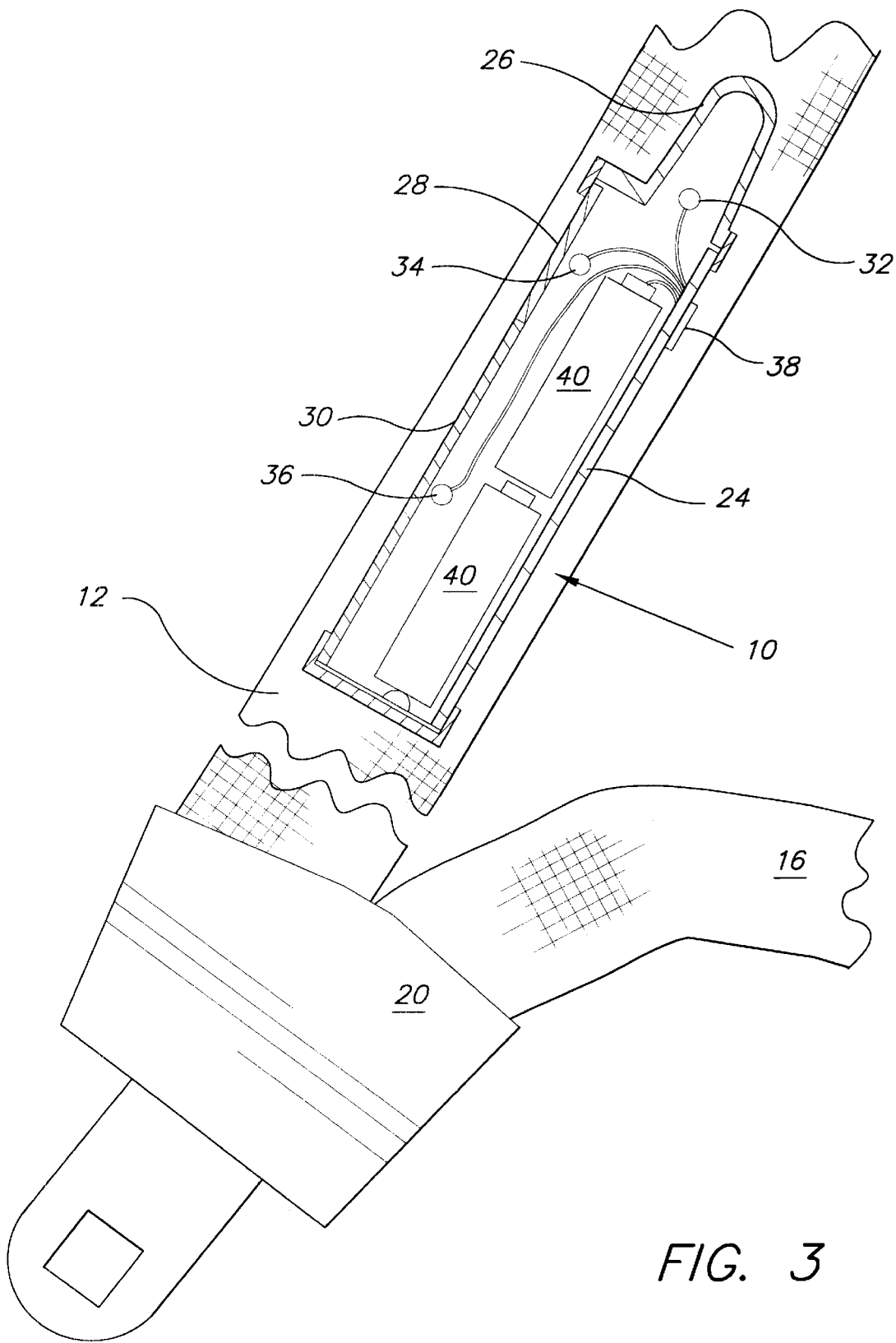
FIG. 3 is a cross-sectional view of the seat belt light.

More specifically, referring to FIG. 3, the seat belt light 10 includes a housing 24 including a primary lens 26 at the top end of the light, and additionally, a secondary lens 28 and tertiary lens 30 along the front surface of the light. Each lens covers a corresponding bulb 32,34,36 internally housed by housing 24. The housing includes a switch 38 which is operably connected to each of the bulbs 32,34,36, the switch 38 being movable between one of three on positions activating each of the bulbs. Batteries 40, located inside the housing opposite the lenses 26,28,30, provide electrical power for the bulbs. Thus, by moving switch 38 to one of the three closed positions, the batteries 40 are brought into selective electrical connection with the bulbs. This permits use of the primary lens 26 (the blue one) and associated bulb 32 for compliance purposes as described above, and leaves the remaining two bulbs for other purposes. For example, one may be a flashing light 28 for emergency purposes where or when other automotive electrical systems have failed.

Focusing now on the key-operated buckle 18, seat belt buckle 18 includes male end 20, attached to shoulder belt 12 and lap belt 16, and female end 22. The buckle includes key-operated lock 24, which can be locked to prevent the male end 20 from being separated from female end 22. This buckle 18 prevents a child from releasing the seat belt while the car is in motion. The parent places the child in the seat, buckles the seat belt, and turns the key to lock the buckle. The child then has no way of unbuckling the belt while the car is in motion. The parent will preferably also activate the seat belt light 10 to provide a visual indication of seat belt use; however, the third lens 30 may be activated to indicate that the child is in proper compliance with other child seat safety laws. It is to be understood that the present invention is not limited to the embodiment described above, but encompasses any and all embodiments within the scope of the following claims.

I claim:

1. In a seat restraint, an apparatus for providing a visual indication of seat belt usage, said apparatus comprising:

a belt having a shoulder portion, a lap portion, a female buckle portion and a male buckle portion;

said female buckle portion being anchored to a seat, said male buckle portion being coupled between said shoulder portion and said lap portion;

said female buckle portion including means for locking said male buckle portion therein, whereby unauthorized separation of said male buckle portion from said female buckle portion is prevented;

a housing fixedly attached to said shoulder portion, said housing containing a light source, a power supply, and switch means for actuating the light source; whereby actuation of the light source by the switch means provides visual indication of the seat belt usage.

2. In the seat restraint according to claim 1, wherein said light source consists of at least one light bulb with colored lens.

3. In the seat restraint according to claim 2, wherein said colored lens includes a blue lens.

4. In the seat restraint according to claim 2, wherein said at least one light bulb with colored lens includes two light bulbs with colored lenses, one of the light bulbs with colored lenses being an emergency flasher.

5. In the seat restraint according to claim 4, wherein said means for locking includes a key-operated mechanism for selectively releasing said male buckle portion from said female buckle portion.

6. In the seat restraint according to claim 1, wherein said means for locking includes a key-operated mechanism for selectively releasing said male buckle portion from said female buckle portion.

* * * * *